United States Patent [19]

Herrmann

[11] Patent Number: 4,497,571

[45] Date of Patent: Feb. 5, 1985

[54] PHOTOGRAPHIC ENLARGEMENTS

[76] Inventor: John J. Herrmann, 300½ 63rd St. Ocean, Marathon, Fla. 33050

[21] Appl. No.: 499,203

[22] Filed: May 31, 1983

[51] Int. Cl.³ ..................... G03B 27/52; G03B 27/32
[52] U.S. Cl. ...................................... 355/40; 355/52; 355/77
[58] Field of Search ..................... 355/40, 30, 43, 52, 355/63, 64, 77

[56] References Cited

U.S. PATENT DOCUMENTS

| 2,552,990 | 5/1951 | McKay | 355/52 |
| 2,970,515 | 2/1961 | Simpson | 355/52 X |
| 2,982,176 | 5/1961 | Kay | 355/40 X |
| 4,003,653 | 1/1977 | Kelly | 355/40 X |

Primary Examiner—Richard A. Wintercorn
Attorney, Agent, or Firm—Allegretti, Newitt, Witcoff & McAndrews, Ltd.

[57] ABSTRACT

A method of and apparatus for producing a second photographic negative film segment having low grain from an original high grain negative in which an enlarger projects an image of the original negative onto five grain film located at an image plane on a light box. After development of the last-named film it is located at the same image plane, illuminated by the light source in the light box, and a third film segment is exposed at the same plane initially carrying the original high grain negative.

6 Claims, 4 Drawing Figures

PHOTOGRAPHIC ENLARGEMENTS

FIELD OF THE INVENTION

This invention relates principally to the field of equipment and processes for photographic enlargement.

BACKGROUND OF THE INVENTION

Photographic negative film has grain, which causes discontinuities in photographic images, because of the silver halide crystals of which photographic negative film is made. The effect is pronounced in enlargements, especially poster enlargements. Grain varies with type of film, being more prominent in fast films, which have comparatively large silver halide particles. As a result, enlargements made directly from high grain negative film, especially high grain negative film of the 35 mm of other small size types, have suffered greatly from grain. Fast film is desirable for high speed action or low light conditions. The options of photographers have been to accept the grain of such films, compromise their abilities and creativity by using low grain film, or use expensive, relatively rare cameras producing large negatives.

SUMMARY OF THE INVENTION

The object of the inventor in the making of this invention was to permit the making of superior enlargements from high grain negative film, especially high grain 35 mm negative film by serious amateur and professional photographers alike, without expensive, complex equipment, and utilizing the inexpensive 35 mm enlargers many such photographers already possess.

In a principal aspect, the present invention is an apparatus for producing superior print enlargements from high grain film. In another principal aspect, the invention is the process of producing the enlargements. In still another aspect, the invention is the enlargements produced by the process.

Thus, in a principal aspect, the invention is an apparatus for superior print enlargement of a photographic image existing in developed negative on a first photographic negative film segment having high grain. The apparatus comprises a conventional enlarger having an enlarger holding means, an enlarger illumination means, an enlarger housing means, enlarger switch means, and an enlarger lens means. The enlarger holding means successively, releasably holds in a first location the first, developed, photographic negative film segment and thereafter a second photographic negative film segment being unexposed and having low grain. The enlarger illumination means projects light through the first photographic negative film segment while that segment is in the first location, to produce projected light of the photographic image. The enlarger housing means confines the projected light along a desired path. The enlarger switch means selectively actuates the illumination means, and the lens means, located along the desired path, focuses the projected light along the path.

The apparatus further comprises a light box having an at least translucent surface, a light box holding means and light box housing, illumination and switch means. The light box holding means successively, releasably holds in a second location on the surface a third photographic negative film segment being unexposed, and thereafter, the third photographic negative film segment when exposed and with the image developed thereon.

The light box is adapted to be positioned relative to the enlarger for placing the surface along the path. The light box is further adapted to be positioned relative to the enlarger lens means for focusing by the enlarger lens means of the projected light onto the third photographic negative film segment while it is in the second location and unexposed, to expose it, and thereby produce the photographic image latent thereon. The exposed third film segment may then be released from the apparatus, the latent image thereon developed thereon, and the third photographic negative film segment with the image developed thereon returned to the second location.

The light box illumination means, light box housing means and light box switch means selectively project confined light through the surface and the exposed, developed, third photographic negative film segment, while returned to the second location, back along the desired path through the enlarger lens means onto the second, unexposed, low grain, photographic negative film segment to produce the photographic image latent thereon. The second photographic negative film segment may then be released from the enlarger, the latent image developed thereon, and the second exposed, developed, low grain photographic negative film segment used to produce print enlargements superior in grain to print enlargements produced directly from the first, high grain, photographic negative film segment.

These and other aspects, objects and advantages of the invention are more fully detailed in the detailed description of the preferred embodiment, which follows.

BRIEF DESCRIPTION OF THE DRAWING

The accompanying drawing includes four figures, briefly as follows.

DETAILED DESCRIPTION OF THE PREFERRED EMBODIMENT

Figure 1:
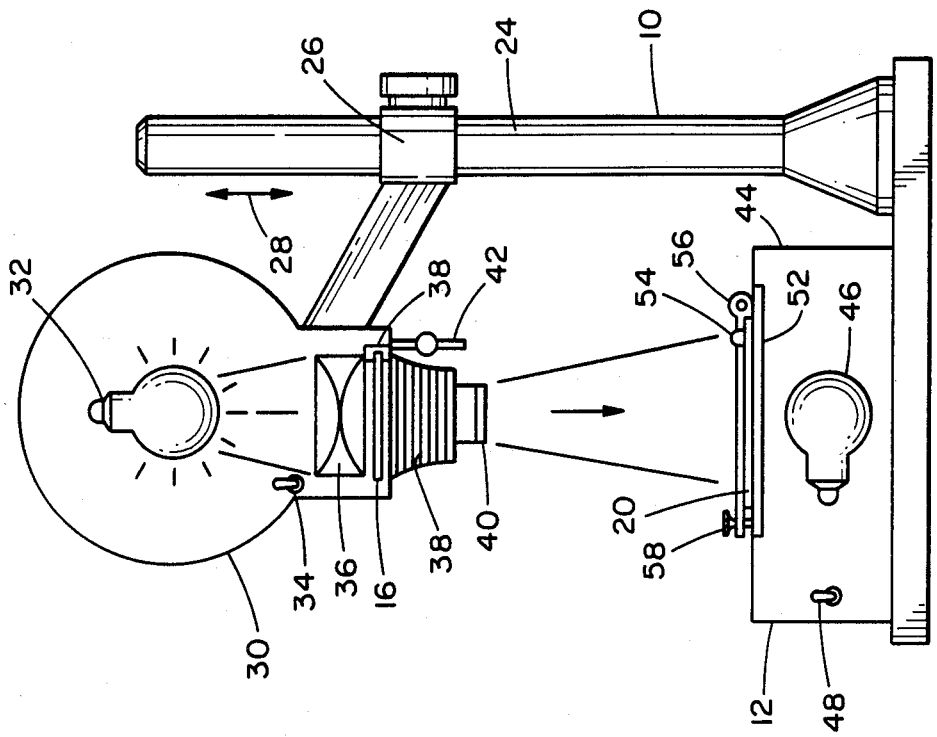
FIG. 1 is a first, schematic side elevation view of a preferred photographic enlarger 10 and light box 12 being used to expose a negative 20 from a negative 16.
Figure 2:
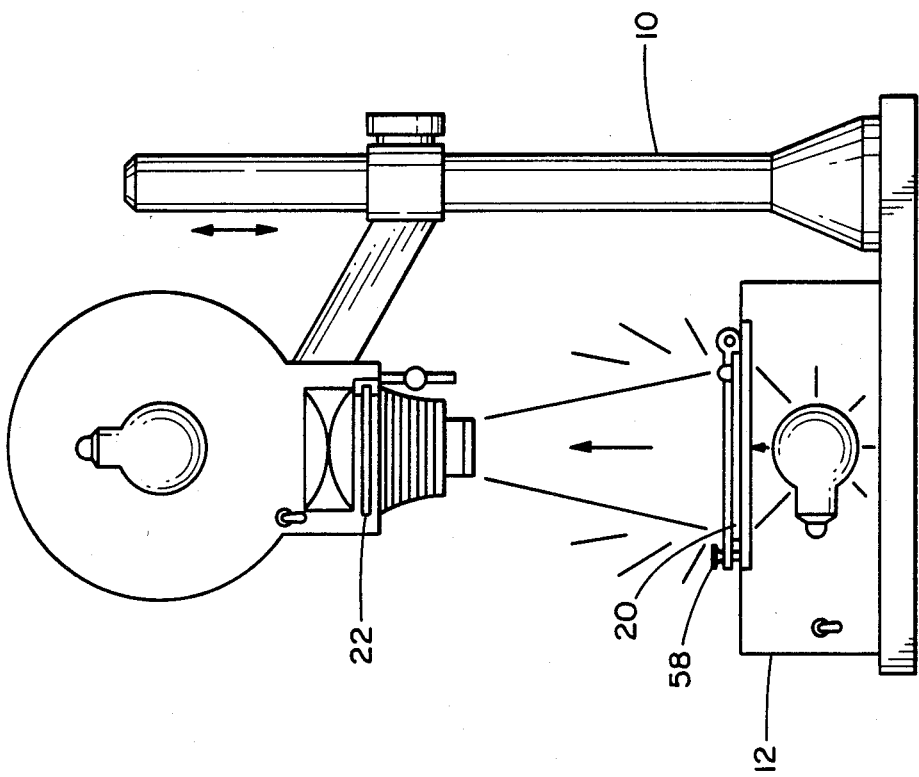
FIG. 2 is a second, schematic side elevation view similar to FIG. 1 of the preferred enlarger and light box being used to expose a negative 22 from the negative 20, after development of the negative 20.
Figure 3:
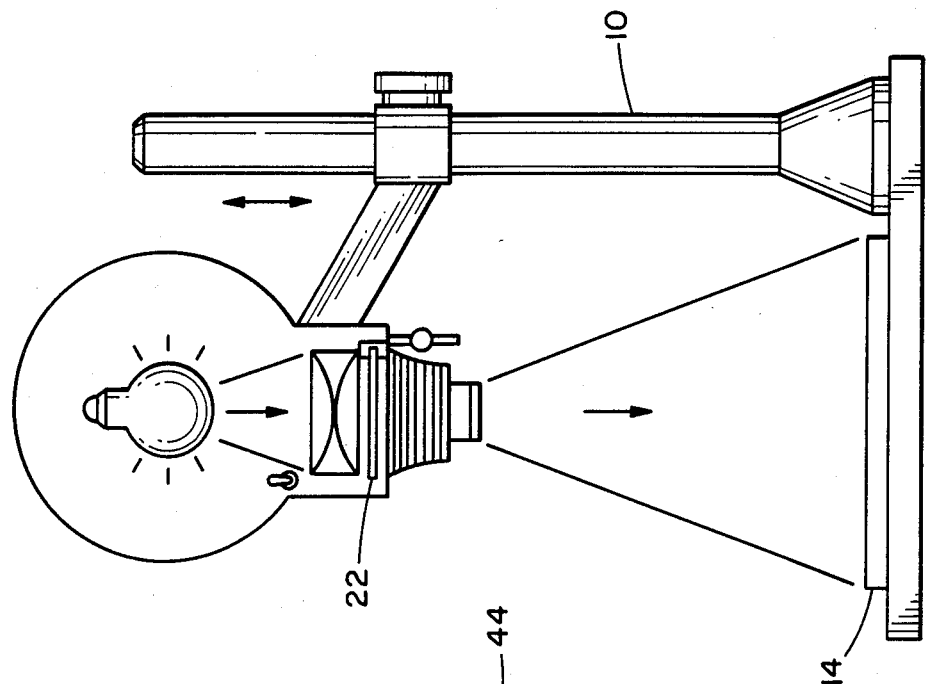
FIG. 3 is a third, schematic side elevation view similar to FIGS. 1 and 2, with the light box removed and the enlarger being used to produce a print enlargement 14 from the exposed, developed negative 22.

Referring to all FIGS. 1–4 of the accompanying drawing, the preferred apparatus of the present invention includes an enlarger generally designated 10 and a light box generally designated 12. The apparatus and the preferred method produce, as in FIG. 3, a preferred enlargement 14 from a photographic negative film segment 22, after the segment 22 is exposed from another segment 20, as in FIG. 2, and after the segment 20 is exposed from still another segment 16, as in FIG. 1.

Referring to FIG. 1, the enlarger 10 includes a stand 24, and an arm 26 mounted on the stand 24 for vertical movement as designated by arrow 28. An enlarger housing 30 on the arm 26 includes an enlarger, bulb 32 suitably wired with a switch 34 and power source (not shown), a condenser lens 36, a film holder 38 for successively, releasably holding the film segments 16, 22 in a first location, a bellows 38 and a focusing lens 40. The housing and condenser lens 36 confine light within to a desired downward path and the bulb 32 thereby projects confined light through the condenser lens 36, the film segment 16, bellows 38 and focusing lens 40. The lens 40 focuses the projected light along the desired path to a variety of desired image locations, one of which is the location of the film segment 20, through a manual adjustment 42.

Figure 4:
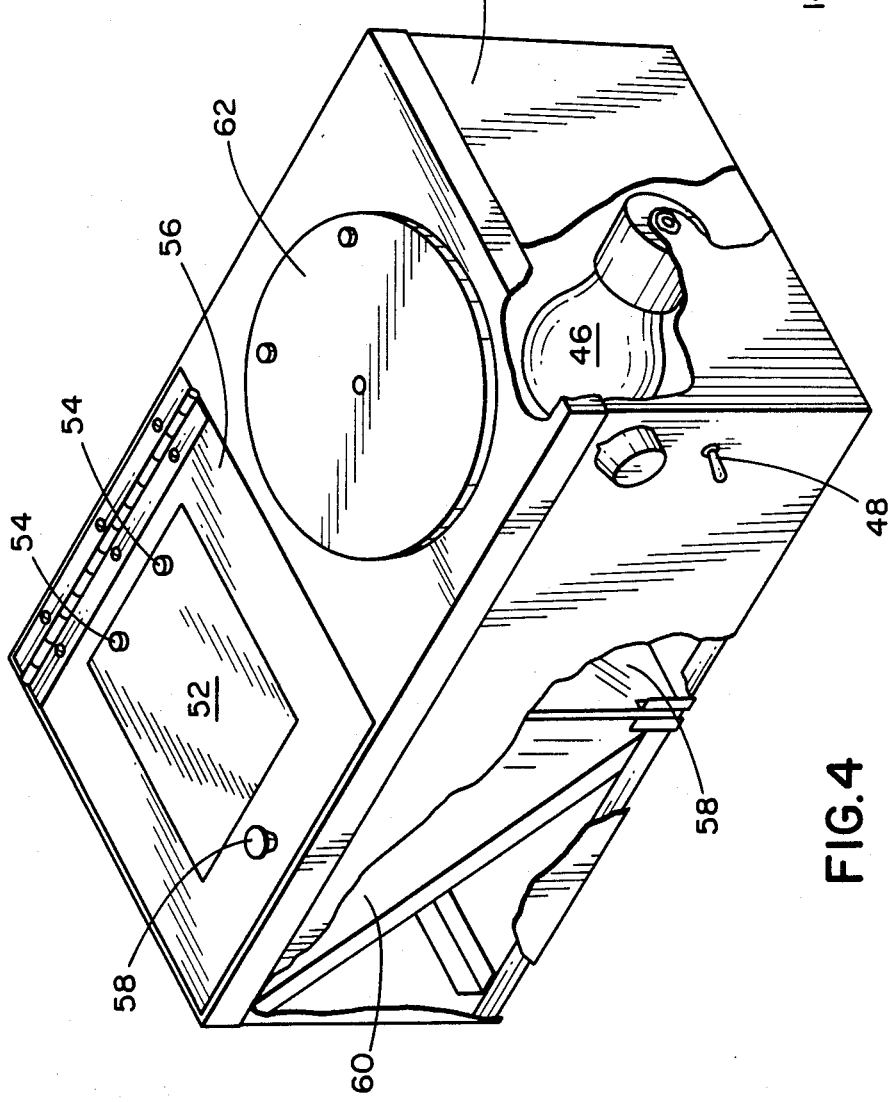
FIG. 4 is a perspective view of a most preferred light box.

The light box 12 includes a housing containing a bulb 46 suitably wired to another switch 48 and a power source (not shown), a translucent hard plastic upper surface 52, registration pins 54 for repeatedly holding the film 20, which is punched to match, in a second location, and a hinged cover 56 and latch 58 for further holding the film 20. As most preferred, as shown in FIG. 4, the bulb 48 is horizontally offset from the surface 52, for inclusion of a light diffusing panel 58 and a mirror 60. The mirror 60 directs light from the bulb 48 passing through the panel upward through the surface 52.

As shown, the light box 12 is adapted to be positioned relative to the enlarger 10 for placing the surface 52 along the desired light path. The box 12 is further adapted to be positioned relative to the enlarger lens 40 for focusing by the enlarger lens 40 of the projected light from the bulb 32 onto the segment 20 while it is in the second location and unexposed, to expose it.

The light box bulb 46, housing 44 and light box switch 48 are adapted to, together, selectively project confined light through the surface 52 and the segment 20, once it is exposed, developed, and returned to the second location, back along the desired path through the enlarger lens 40 onto the segment 22, to expose the segment 22.

The preferred method of this invention for producing superior print enlargements uses the preferred apparatus. To remind the reader, the method is for producing superior print enlargements of a photographic image existing in developed negative on a first photographic negative film segment, such as segment 16, having high grain.

The preferred method comprises many steps. First, a first negative film segment such as segment 16, having high grain, is placed in the holder 38 of the enlarger 10. Second, an unexposed negative film segment such as segment 20 is placed on the surface 52 on the registration pins 54 under the cover 56. Third, the switch 34 is thrown as in FIG. 1, thereby lighting the bulb 32. Fourth, the projected light of the bulb 32 is manually focused on the unexposed segment such as segment 20. The segment is thereby exposed.

Fifth, the segments such as 16, 20 are removed from the apparatus, and the bulb 32 switched off. The enlarger is not refocused or moved. The box 12 is not moved. The segment such as 20 is developed.

The teaching of the development of film is beyond the scope of this invention. Reference should be had to known techniques.

After the sixth step of development is completed, the film segment such as 20 is returned to the surface 52 of the light box 12 on the pins 54 under the cover 56. Another unexposed, low grain, negative film segment such as 22 is placed as in FIG. 2, in the holder 38 of the enlarger 10. The second switch 48 is thrown, as in FIG. 2, thereby lighting the bulb 46. (The bulb 32 stays off.) Light projects upward through the lens 40, using the enlarger 10 in reverse. This exposes the low grain film segment such as 22. The film segment such as 22 is developed, and as in FIG. 3, used to create print enlargements such as 14. Because of the low grain of a segment such as 22, the enlargements such as 14 are superior in grain to print enlargements produced directly from the segment 16.

The invention is most preferably practiced with a 35 mm enlarger, with film segment 16 being 35 mm film, with segment 20 being a 4 inch by 5 inch lithographic film segment, and with segment 22 being a 35 mm size segment of lithographic film.

Creativity enhancing and other features, may be a part of the preferred apparatus. As an example, a turntable 62 may be provided. The turntable is used after the creation of a Kodolith TM film segment 20, and a Kodolith TM contact print positive from segment 20. The segment 20, positive and a transparent panel are sandwiched on the turntable 62, over an unexposed segment of Kodolith TM negative film. A light is shined on the turntable at an angle and the turntable manually spun, to create a line drawing image on the unexposed film. The width of the lines of the line drawing image are varied by the angle of the light on the turntable and the thickness of the transparent sandwich panel.

Because such features may be included without departing from the invention, and to particularly point out and distinctly claim the subject matter regarded as invention, the following claims conclude this specification.

What is claimed is:

1. Apparatus for superior print enlargement of a photographic image existing in developed negative on a first photographic negative film segment having high grain, comprising:
   an enlarger having,
   an enlarger holding means for successively, releasably holding in a first location the first photographic negative film segment and thereafter a second photographic negative film segment being unexposed and having low grain,
   an enlarger illumination means for projecting light through the first photographic negative film segment while in the first location to produce projected light of the photographic image,
   an enlarger housing means for confining the projected light along a desired path,
   an enlarger switch means for selectively actuating the illumination means,
   lens means along the desired path for focusing the projected light along the path; and
   a light box having,
   an at least translucent surface,
   a light box holding means for successively, releasably holding in a second location on the surface a third photographic negative film segment being unexposed and thereafter the third photographic negative film segment when exposed and with the image developed thereon,
   the light box being adapted to be positioned relative to the enlarger for placing the surface along the path and further adapted to be positioned relative to the enlarger lens means for focusing by the enlarger lens means of the projected light onto the photographic negative film segment while in the second location and unexposed, to expose the third photographic negative film segment and thereby produce the photographic image latent thereon, whereby the exposed third segment may be released from the apparatus, the latent image thereon developed thereon and the third photographic negative film segment with the image developed thereon returned to the second location, light box illumination means, light box housing means and light box switch means for selectively projecting confined light through the surface and the exposed, developed, third photographic negative film segment, while returned to the second location, back along the desired path through the enlarger lens means onto the second, unexposed, low grain, photographic negative film segment to produce the photographic image latent thereon, whereby the second photographic negative film segment may be released from the enlarger, the latent image developed thereon, and the second exposed, developed, low grain photographic negative film segment used to produce print enlargements superior in grain to print enlargements produced directly from the first photographic negative film segment.

2. Apparatus as in claim 1 in which the enlarger is a 35 mm enlarger, and the enlarger holding means is adapted to hold 35 mm negative film segments, whereby the first and second negative film segments are 35 mm negative film segments.

3. Apparatus as in claim 1 in which the light box is a lithographic film light box, whereby the third negative film segment is a 4 inch by 5 inch lithographic negative film segment.

4. An apparatus as in claim 1 in which the second holding means comprises registration pins for holding punched negative film segments.

5. A method for producing superior print enlargements of a photographic image existing in developed negative on a first photographic negative film segment having high grain, the method utilizing apparatus including an enlarger having, an enlarger holding means for successively, releasably holding in a first location the first photographic negative film segment and thereafter a second photographic negative film segment being unexposed and having low grain, an enlarger illumination means for projecting light through the first photographic negative film segment while in the first location to produce projected light of the photographic image, an enlarger housing means for confining the projected light along a desired path, an enlarger switch means for selectively actuating the illumination means, lens means along the desired path for focusing the projected light along the path; and a light box having, an at least translucent surface, a light box holding means for successively, releasably holding in a second location on the surface a third photographic negative film segment being unexposed and thereafter the third photographic negative film segment when exposed and with the image developed thereon, the light box being adapted to be positioned relative to the enlarger for placing the surface along the path and further adapted to be positioned relative to the enlarger lens means for focusing by the enlarger lens means of the projected light onto the photographic negative film segment while in the second location and unexposed, to expose the third photographic negative film segment and thereby produce the photographic image latent thereon, light box illumination means, light box housing means and light box switch means for selectively projecting confined light through the surface and the exposed, developed, third photographic negative film segment, while returned to the second location, back along the desired path through the enlarger lens means onto the second, unexposed, low grain, photographic negative film segment to produce the photographic image latent thereon, the method comprising:

(a) placing the first negative film segment in the first holding means of the enlarger;
(b) placing the third negative film segment on the surface in the second holding means of the light box;
(c) switching the first switch means, thereby actuating the first illumination means;
(d) forcusing the projected light on the third negative film segment;
(e) thereby exposing the third negative film segment;
(f) removing the first and third negative film segments from the apparatus;
(g) developing the third negative film segment;
(h) returning the third negative film segment to the surface of the light box in the second holding means;
(i) placing the second negative film segment in the first holding means of the enlarger;
(j) switching the second switch means, thereby actuating the second illumination means;
(k) thereby exposing the second negative film segment;
(l) developing the second negative film segment; and
(m) enlarging the second negative film segment to create print enlargements superior in grain to print enlargements produced directly from the first negative film segment.

6. A print enlargement which is the product of the process of claim 5.

* * * * *